(12) United States Patent
Ramos

(10) Patent No.: US 11,775,712 B1
(45) Date of Patent: Oct. 3, 2023

(54) DETERMINING MECHANICAL RELIABILITY OF ELECTRONIC PACKAGES ASSEMBLED WITH THERMAL PADS

(71) Applicant: ANSYS, Inc., Canonsburg, PA (US)

(72) Inventor: Abel Ramos, Canonsburg, PA (US)

(73) Assignee: Ansys, Inc., Canonsburg, PA (US)

( * ) Notice: Subject to any disclaimer, the term of this patent is extended or adjusted under 35 U.S.C. 154(b) by 238 days.

(21) Appl. No.: 17/179,767

(22) Filed: Feb. 19, 2021

Related U.S. Application Data

(63) Continuation of application No. 16/819,676, filed on Mar. 16, 2020, now Pat. No. 10,963,607.

(51) Int. Cl.
  *G06F 30/30* (2020.01)
  *H01L 23/34* (2006.01)
  *H01L 23/31* (2006.01)

(52) U.S. Cl.
  CPC .......... *G06F 30/30* (2020.01); *H01L 23/3114* (2013.01); *H01L 23/34* (2013.01)

(58) Field of Classification Search
  USPC ........................................................ 716/136
  See application file for complete search history.

(56) References Cited

U.S. PATENT DOCUMENTS

| | | | |
|---|---|---|---|
| 7,284,992 B2* | 10/2007 | Becker | H01L 23/49838 257/E23.07 |
| 10,963,607 B1* | 3/2021 | Ramos | H01L 23/433 |
| 2001/0021596 A1* | 9/2001 | Tamura | H01R 12/52 439/66 |
| 2003/0027373 A1* | 2/2003 | DiStefano | H01L 24/92 438/106 |
| 2006/0038182 A1* | 2/2006 | Rogers | H01L 27/1285 257/77 |
| 2013/0298101 A1* | 11/2013 | Chandra | G06F 30/23 716/136 |

* cited by examiner

*Primary Examiner* — Mohammed Alam

(57) ABSTRACT

Computer-implemented systems and methods are described herein for determining mechanical properties of an electronic assembly. An input specification for a model of the electronic assembly is received, wherein the input specification includes a compressible body and a surrounding component in the electronic assembly. A geometric interference between the compressible body and the surrounding component is identified. A displacement is generated for the compressible body to account for the geometric interference. A non-linear contact is then generated between the displaced compressible body and the surrounding component. The model is updated with the displacement and the non-linear contact. Then, a resulting force equilibrium is determined within the electronic assembly based on the updated model, wherein the resulting force equilibrium is determined by removing the displacement from the updated model.

20 Claims, 12 Drawing Sheets

DETERMINING MECHANICAL RELIABILITY OF ELECTRONIC PACKAGES ASSEMBLED WITH THERMAL PADS

CROSS-REFERENCE TO RELATED APPLICATIONS

The This application is a continuation application of U.S. application Ser. No. 16/819,676, entitled "Determining Mechanical Reliability of Electronic Packages Assembled With Thermal Pads", filed Mar. 16, 2020, which is herein incorporated by reference in their entirety.

FIELD

The technology described herein relates generally to electronic assemblies and more specifically to determining the mechanical reliability of electronic assemblies with an automated simulation.

BACKGROUND

When electronic packages are assembled, internal gasket and thermal pads are compressed, generating an initial stress/deformation state in all components of the package. But the mechanical CAD geometries for electronic packages are usually provided in an assembled position, with the thickness of the thermal pads and gaskets in their resting states. Therefore, hardware designers usually do not know if the package will fulfill its mechanical requirements until physical testing, when the thermal pads are compressed during assembly.

SUMMARY

In accordance with the teachings herein, computer-implemented systems and methods are provided for determining mechanical properties of an electronic assembly. An embodiment of the method comprises receiving an input specification for a model of the electronic assembly, wherein the input specification includes a compressible body and a surrounding component in the electronic assembly. A geometric interference between the compressible body and the surrounding component is identified, and a displacement is generated for the compressible body to account for the geometric interference. A non-linear contact is then generated between the displaced compressible body and the surrounding component. The model is updated with the displacement and the non-linear contact. Then, a resulting force equilibrium is determined within the electronic assembly based on the updated model, wherein the resulting force equilibrium is determined by removing the displacement from the updated model.

A computer-implemented system for determining mechanical properties of an electronic assembly is further described herein, wherein the system comprises one or more data processors and one or more computer-readable storage mediums encoded with instructions for commanding the one or more data processors to execute steps that include the aforementioned method. A non-transitory computer-readable storage medium is further described herein, wherein the storage medium comprises instructions for which when executed cause a processing system to execute steps comprising the aforementioned method.

DETAILED DESCRIPTION

Computer-implemented systems and methods are provided herein for determining mechanical properties, such as the mechanical behavior, of an electronic assembly in a simulation. Specifically, embodiments described herein can be used to determine the final stress state of electronics packages comprising compressible bodies, such as gaskets and/or thermal pads, via an automated simulation. This allows a hardware designer to virtually test the mechanical performance in the early stages of the project, prior to physical assembly.

Figure 1:
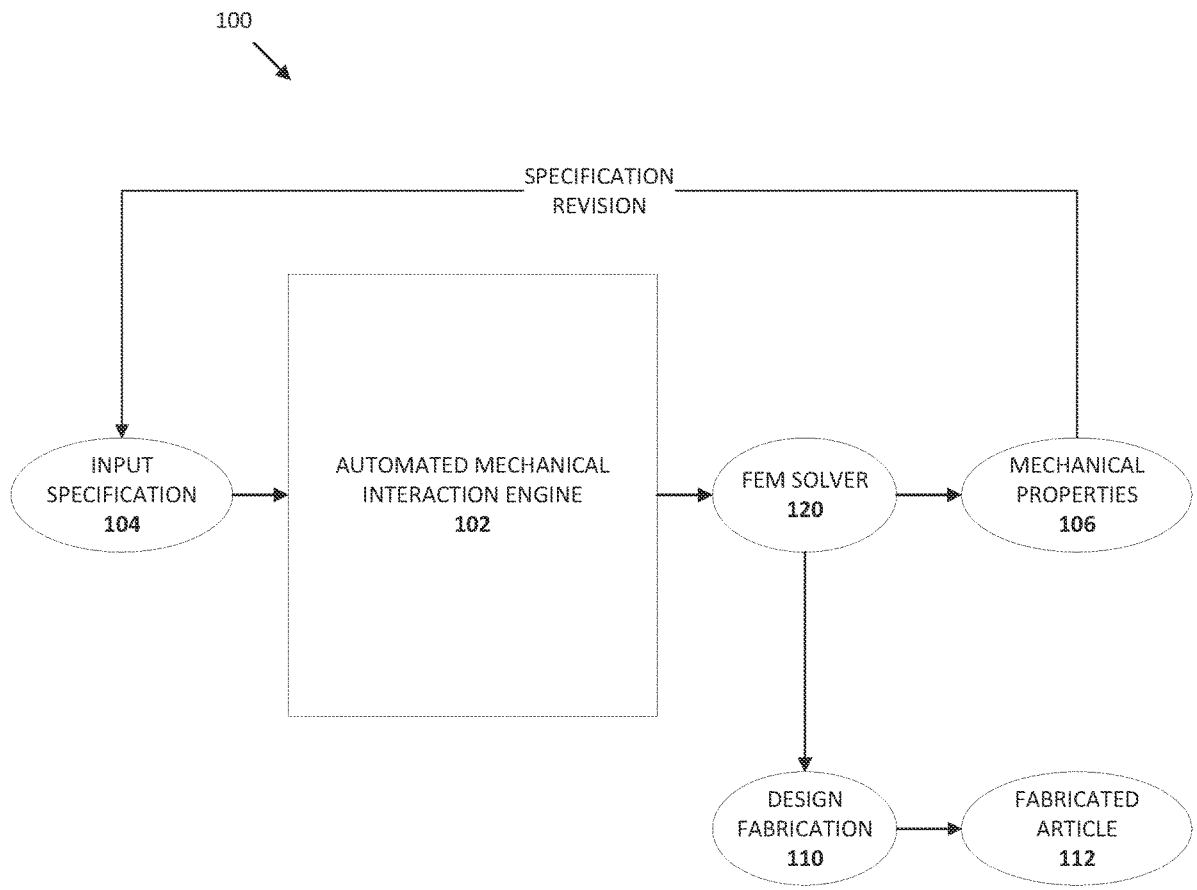
FIG. 1 is a block diagram depicting an embodiment of a computer-implemented mechanical interaction engine for determining mechanical properties of an electronic assembly.

FIG. 1 depicts an embodiment of a computer-implemented environment 100 where an automated mechanical interaction engine 102 and a FEM (Finite Element Method) solver 120 determine mechanical properties 106 of an electronic assembly or package based on an input specification 104, Mechanical properties 106 may include the mechanical behavior of the package when fully assembled. As discussed further below, in embodiments, a user-defined input specification 104 is received by the mechanical interaction engine 102. The input specification 104 may include a mechanical CAD geometry of an electronic package or assembly with one or more compressible bodies (e.g., thermal pads and/or gaskets) and surrounding components. In accordance with the input specification 104, the mechanical interaction engine 102 simulates the interaction between the compressible bodies and their surrounding components in an electronic package. By simulating these interactions, mechanical interaction engine 102 and FEM solver 120 determines the stress state of the assembly in its final assembled configuration.

In embodiments, automated mechanical interaction engine 102 prepares input specification 104 for processing by FEM solver 120. Prior to processing by FEM solver 120, a user may interact with an interface to add additional set-up operations to the model. For example, a user may add additional load steps to model operation conditions, temperature shifts, vibration analyses, different types of boundary conditions, additional thermal/structural loads, etc. The user may also have the option to add bolt pretensions and/or thermal cycling via the user interface. After optional user interaction, mechanical FEM solver 120 determines mechanical properties 106 of the package in its final assembled configuration.

In embodiments, after mechanical properties 106, including a final stress state, are determined, the specification may be revised by a user. The user may wish to revise the specification, for example, if the output indicates that the physical assembly will fail. This revised specification is received by automated mechanical interaction engine 102 for processing, and updated mechanical properties 106 are determined. The automated mechanical interaction engine 102 and FEM solver 120 may also output a design fabrication 110 modeling the electronic package as assembled. Based on the design fabrication 110, a fabricated article 112 is created.

Figure 2A:
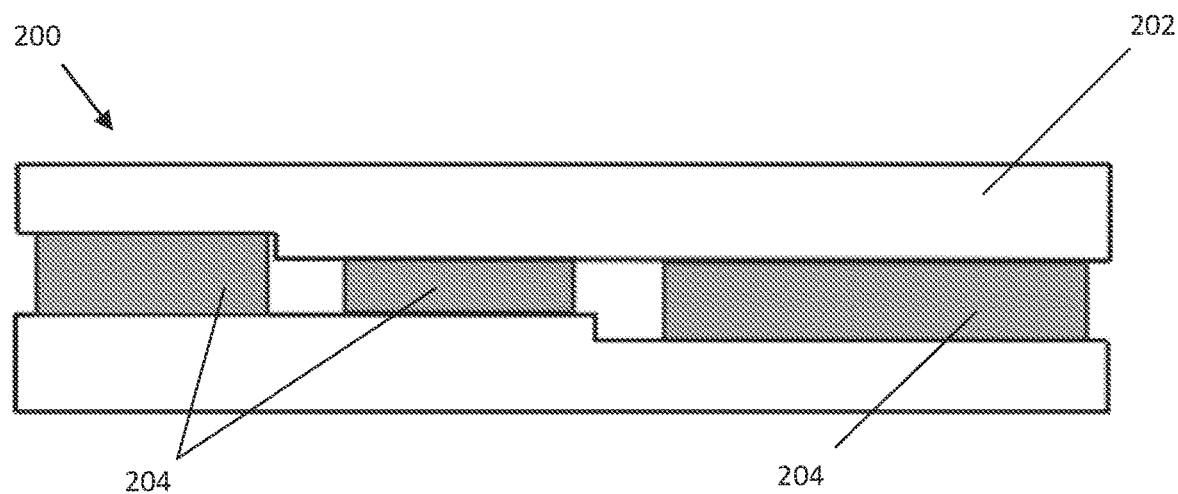
FIGS. 2A-2F depict an embodiment of a method for determining mechanical properties of an electronic assembly in a simulation.

FIGS. 2A-2F depict an example implementation of the automated mechanical interaction engine described briefly above with respect to the FIG. 1 embodiment. FIG. 2A depicts an embodiment of an electronic package 200 as assembled. Electronic package 200 comprises compressible bodies 204 (e.g., thermal pads, gaskets, other hyper-elastic bodies) and surrounding component 202. In embodiments, any component in the package may be classified as a surrounding component. When the electronic package is fully assembled, the compressible bodies are compressed, as seen in FIG. 2A. This creates complex stress states in the entire assembly from the resulting forces exhibited on the surrounding components by the compressed bodies.

Figure 2B:
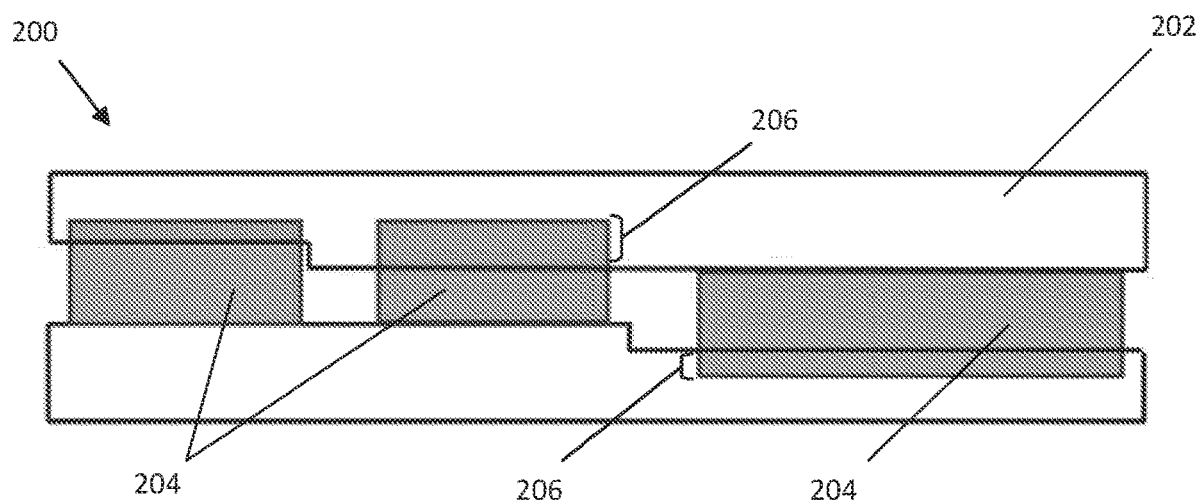

However, mechanical CAD geometries of electronic packages are usually provided in an assembled position with compressible bodies in an initial resting state, i.e., uncompressed. Each compressible body is thus represented with an interference with its surrounding components, as seen in FIG. 2B. These geometric interferences represent the difference in thickness between the compressible bodies in their uncompressed versus compressed states.

FIG. 2B depicts a CAD geometry of electronic assembly 200, comprising compressible bodies 204 and surrounding component 202. Geometric interferences 206 are present where the compressible bodies 204 "overlap" surrounding component 202 in their resting states. In embodiments, the automated mechanical interaction engine described herein receives a mechanical CAD geometry comprising compressible bodies with such geometric interferences as an input specification.

Figure 2C:
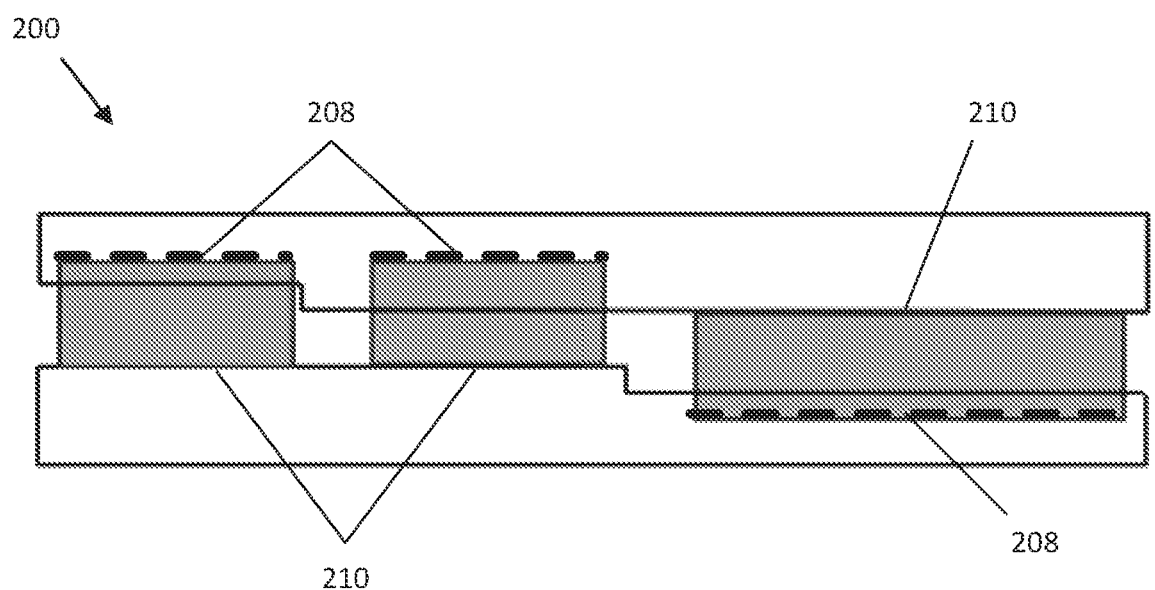

Further, in embodiments, each compressible body has two contacts—a fixed, or bonded, contact along the face of the compressible body where there is no interference, and a non-linear contact along the face where there is an interference. A "contact" is a general way of connecting two or more separate bodies in the model. For example, FIG. 2C displays non-linear contacts 208 between compressible bodies 204 and surrounding component 202 at each geometric interference. These non-linear contacts 208 are used to find the final force equilibrium when the interferences are solved. FIG. 2C also depicts bonded contacts 210, employed in the faces of the compressible bodies where there is no interference. In embodiments, this type of contact is used to prevent from having rigid body motion in the compressible bodies.

Non-linear contacts 208 may be deactivated (e.g., "killed") or activated by the automated mechanical interaction engine using element birth and death technology. In embodiments, non-linear contacts allow their respective bodies to be "in contact" when the bodies' faces are touching, or when they are near. When the respective bodies' faces are a sufficient distance away from one another, the non-linear contacts are in "open mode." As seen in FIG. 2C, non-linear contacts 208 are initially deactivated and geometric interferences 206 are present. While the assembly is in this state, the automated mechanical interaction engine identifies or calculates each geometric interference 206 by determining the amount of "overlap" between a compressible body 204 and its surrounding components 202. With all non-linear contacts deactivated and the compressible bodies in their resting states, as in FIG. 2C, an initial force equilibrium in each compressible body can be determined.

Figure 2D:
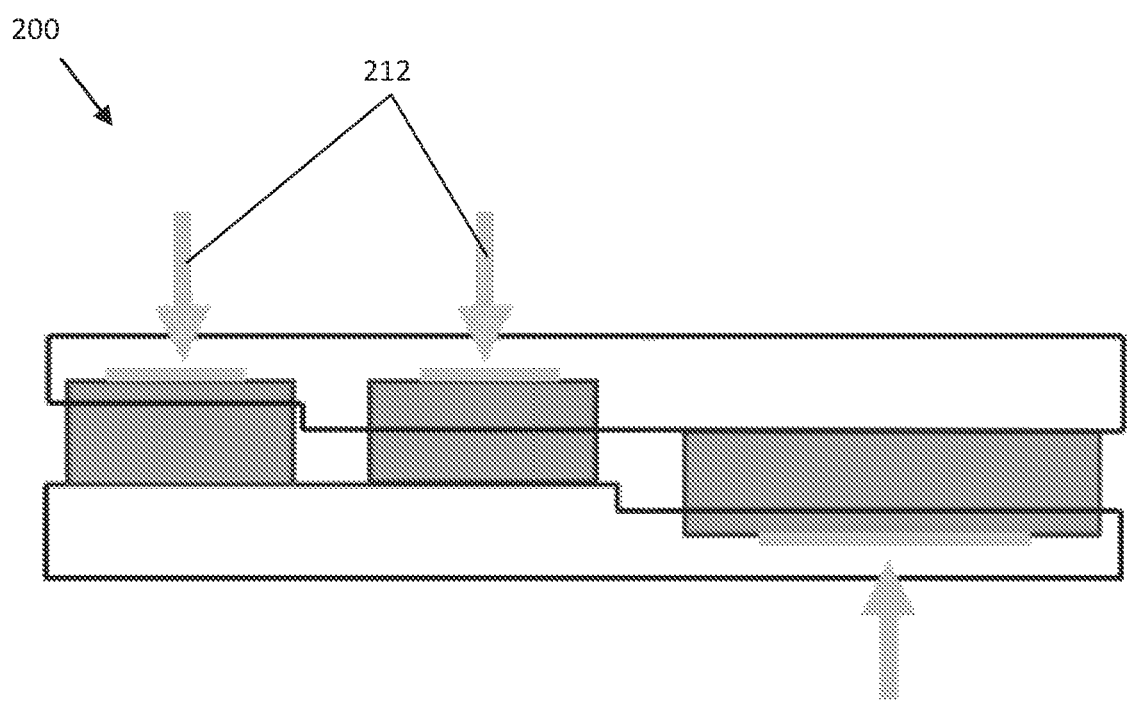
Figure 2E:
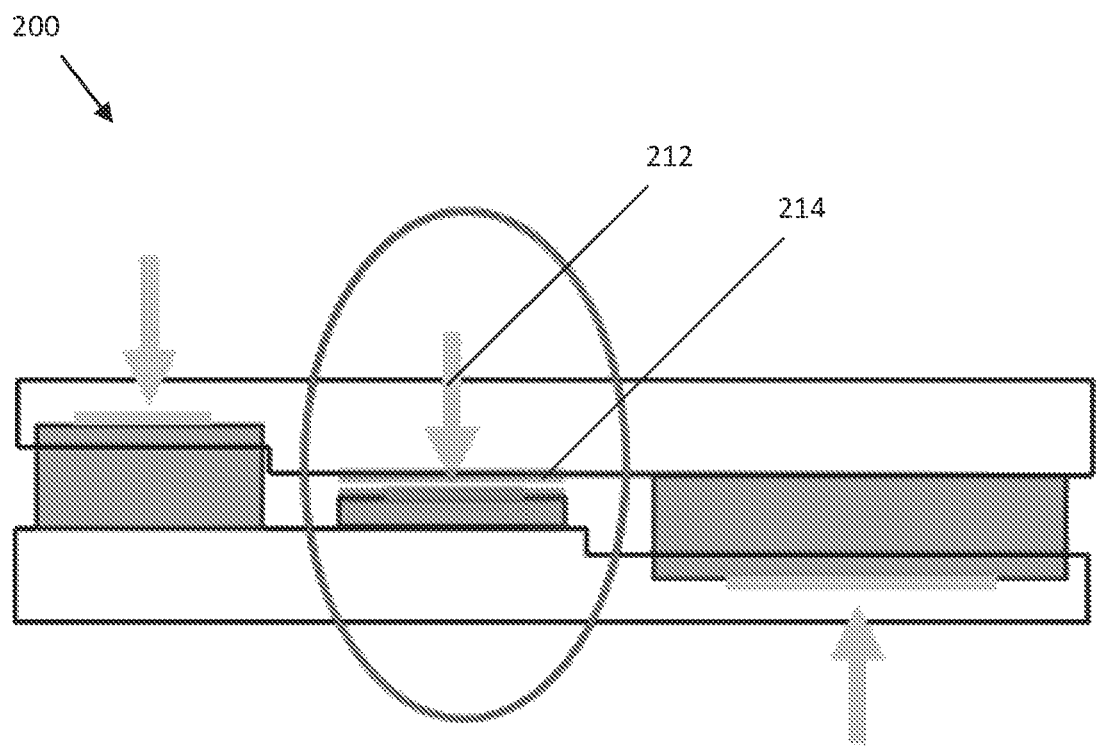

To simulate the package in its assembled configuration, compressions, or displacements, are then applied to each compressible body, as seen in FIGS. 2D-2E. In embodiments, the automated mechanical interaction engine applies compressions by generating one or more displacements for each compressible body to account for the geometric interferences. A displacement may represent both the distance and direction along a straight line from the initial position to the final position of a point trajectory (e.g., a vector). Applying compressions to the compressible bodies, e.g., generating displacements, serves to simulate displacements that occur to each compressible body when the package is physically assembled.

In embodiments, compression 212 is applied in the normal direction, i.e., vertical direction, and is equal to the calculated interference thickness. In other embodiments, the applied compression 212 in the normal direction is greater than the interference thickness, for example, the interference value increased 5%. A compression in the parallel direction is also applied to each compressible body to prevent movement in the parallel plane.

After a compressible body is displaced via an applied compression, as in FIG. 2E, the corresponding non-linear contact 214 is activated. As discussed above, non-linear contacts are activated in the engine via element birth and death technology, With both the compression 212 and non-linear contact 214 activated, a new force equilibrium is determined.

Figure 2F:
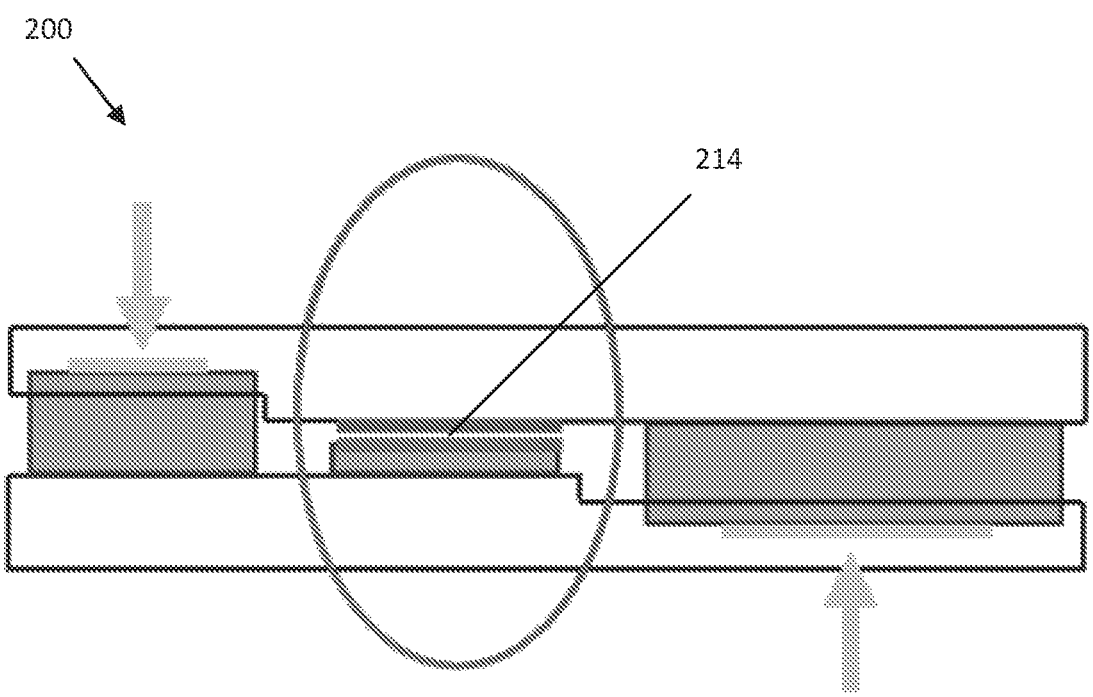

Then, as seen in FIG. 2F, the applied compressions are removed but the non-linear contact 214 remains active, serving to fix the compressible body in its displaced state. In embodiments, the automated mechanical interaction engine removes compressions by removing the displacements previously generated for each compressible body. In embodiments, the compression in the normal direction is removed first, and the compression in the parallel direction is removed second. New force equilibriums are established as each compression is removed. After all compressions are removed, the final force equilibrium is determined to find the stress state of the package. In embodiments, the stress state of the package is solved by a mechanical FEM solver.

Figure 3:
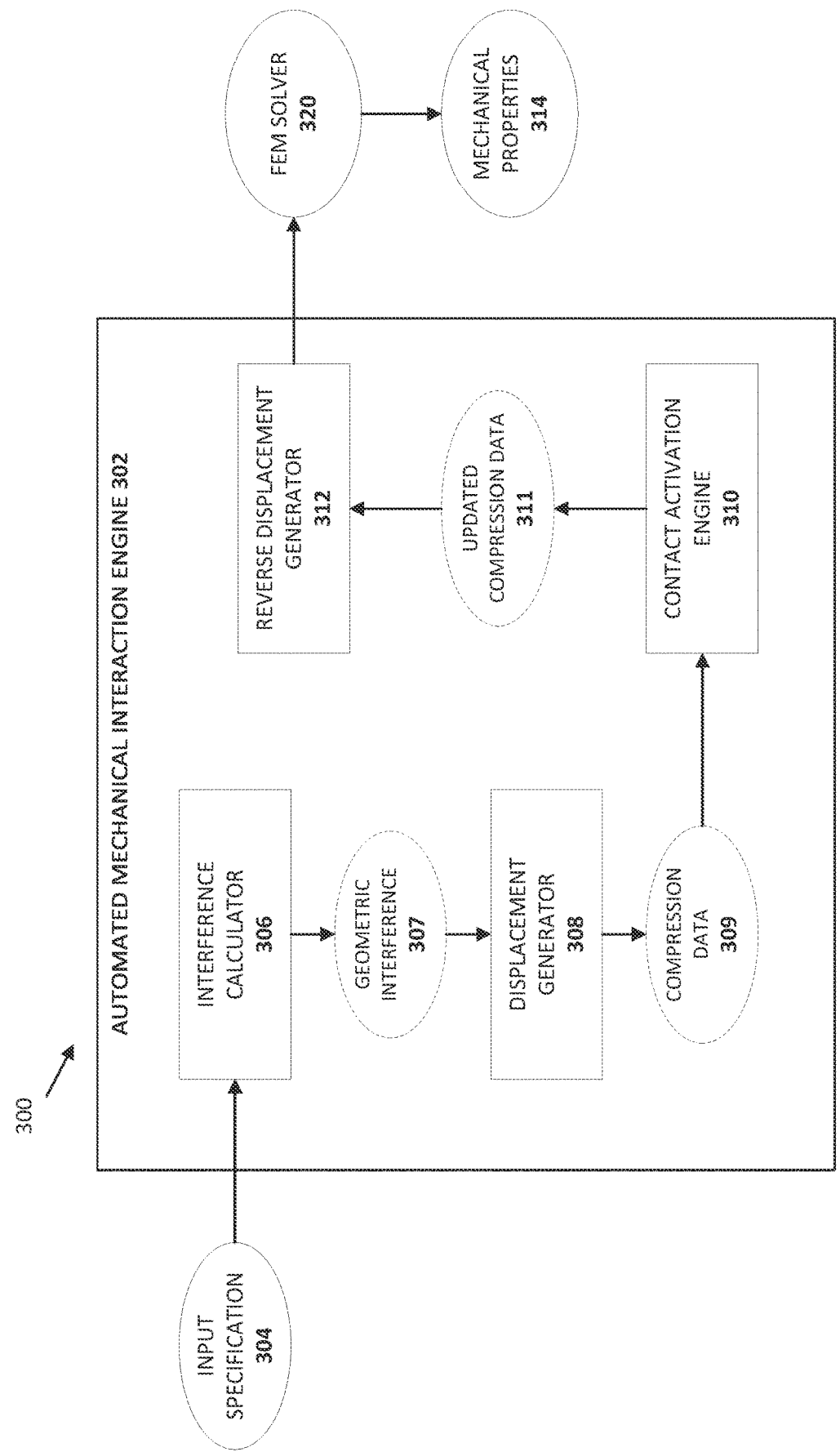
FIG. 3 is a block diagram depicting an embodiment of a computer-implemented mechanical interaction engine for generating data regarding mechanical properties of an electronic assembly.
Figure 4A:
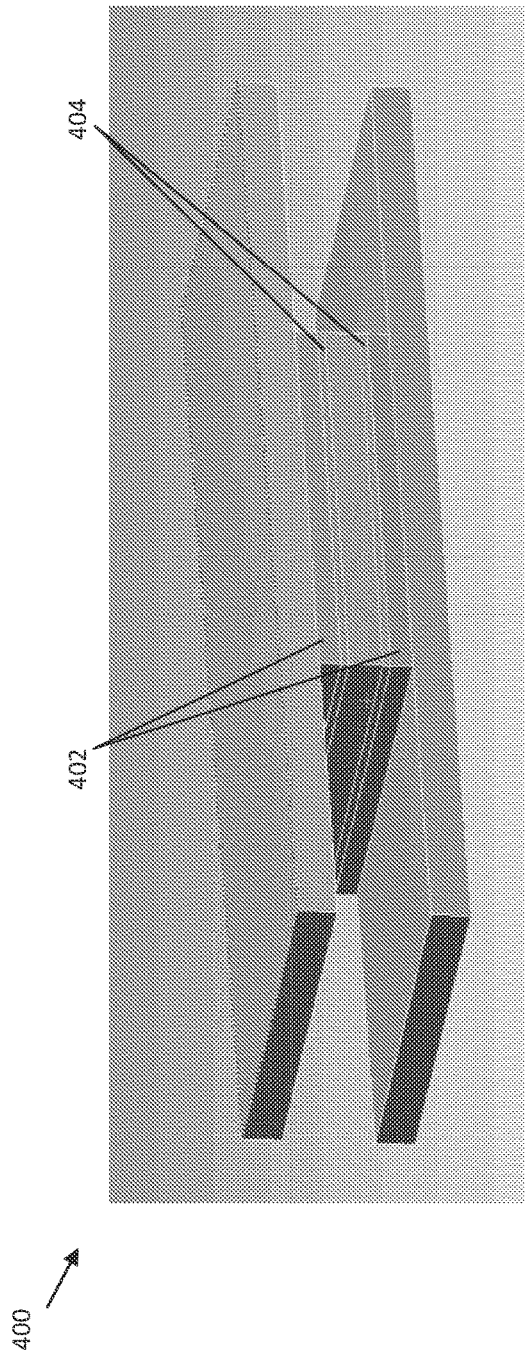
FIGS. 4A-4D depict example simulation methodology and results for determining mechanical properties of an electronic assembly.
Figure 4B:
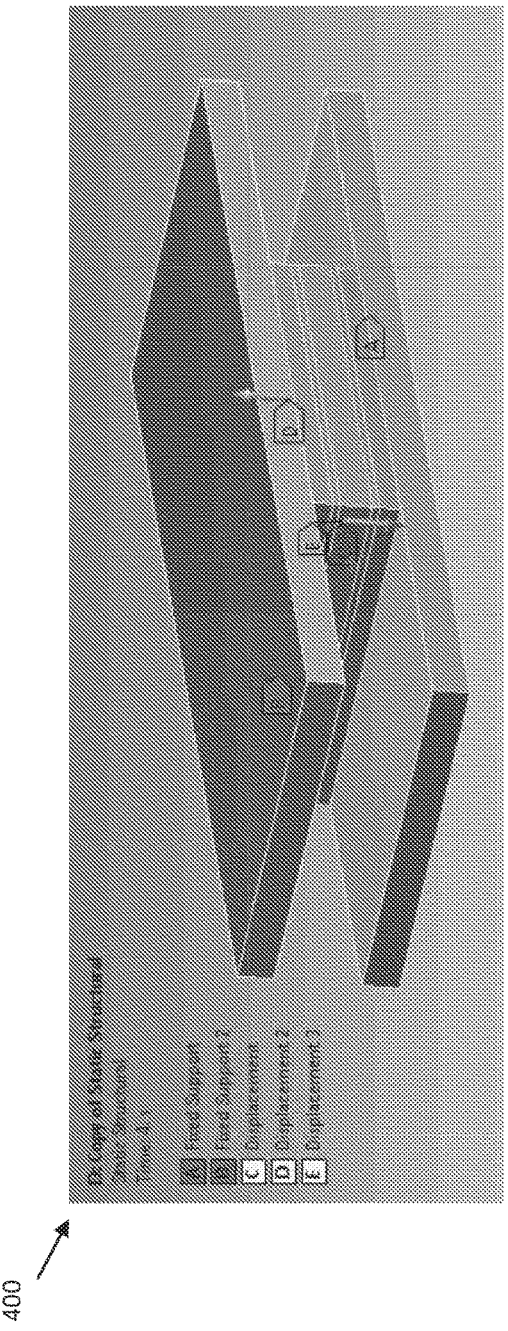
Figure 4C:
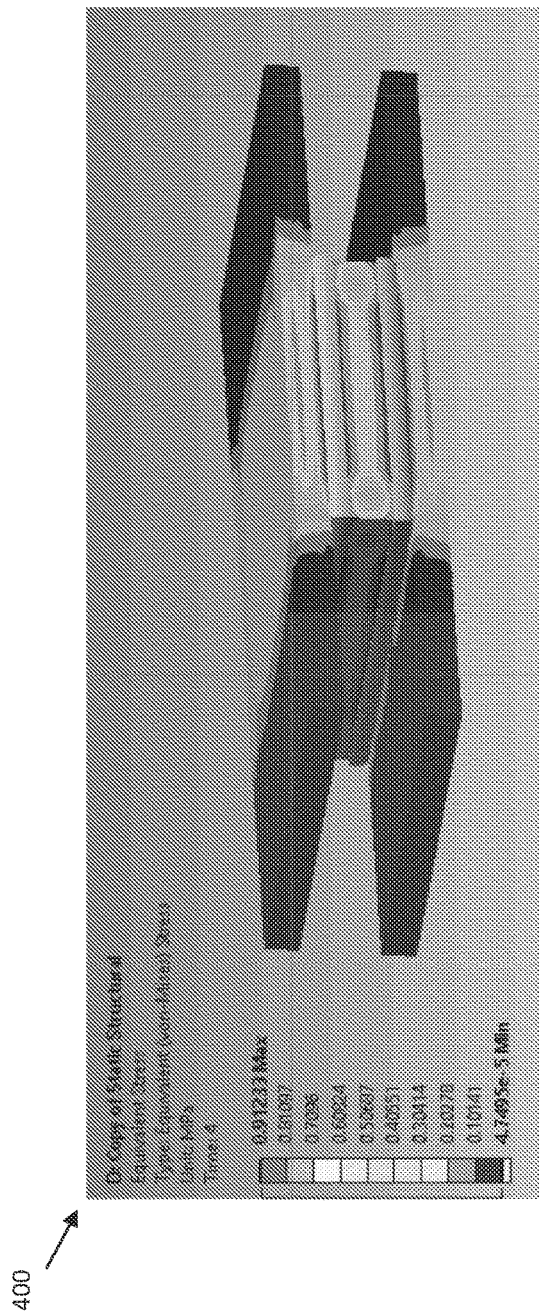
Figure 4D:
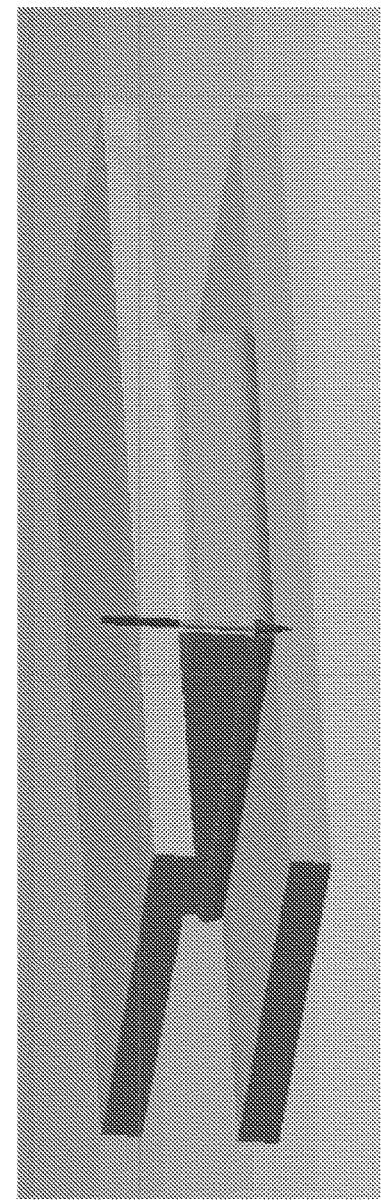

A more detailed embodiment of the automated mechanical interaction engine for performing the aforementioned steps is represented in FIG. 3. Each step performed by the automated mechanical interaction engine requires no user interaction. Specifically, FIG. 3 depicts a computer-implemented environment 300 where an automated mechanical interaction engine 302 in communication with an FEM solver 320 determines mechanical properties 314 of an electronic assembly via interference calculator 306, displacement generator 308, contact activation engine 310, and reverse displacement generator 312.

In the FIG. 3 embodiment, the engine receives input specification 304 from a user, including a CAD geometry of an electronic assembly comprising one or more compressible bodies and surrounding components. As discussed above with respect to FIG. 2B, CAD geometries of electronic packages include compressible bodies in their uncompressed states, therefore, interferences are present between the compressible bodies and surrounding components. Based on the input data, interference calculator 306 calculates these geometric interferences 307 by measuring the "overlap" between the compressible bodies and the surrounding components. A force equilibrium of the electronic assembly with all bodies and components in their resting states may also be established.

Next, displacement generator 308 applies compressions, e.g., generates one or more displacements, to account for the geometric interferences of each compressible body. In embodiments, the applied compressions create sufficient displacement to remove each geometric interference. As discussed above with respect to FIGS. 2D-2E, compressions may be applied in both the normal and parallel directions. The resulting compression data 309, comprising information regarding the assembly with all compressible bodies in their displaced positions, is received by contact activation engine 310. In embodiments, a rendering of the assembly with compressible bodies in their displaced positions is displayed to a user via a graphical user interface.

In embodiments, contact activation engine 310 activates non-linear contacts on the faces where compressions are applied, thus serving to fix the compressible bodies in their displaced states. Updated compression data 311, including information regarding the assembly with all compressible bodies in their displaced positions and all non-linear contacts activated, is received by reverse displacement generator 312. Updated compression data 311 may also comprise the new force equilibrium of the assembly with all compressions and non-linear contacts active.

Then, the applied compressions (e.g., the generated displacements) are removed, or deactivated, in reverse displacement generator 312. As discussed above, in embodiments, the compression in the normal direction is removed first, and a new force equilibrium is established. Then, the compression in the parallel direction is removed, and a final force equilibrium is established. In embodiments, the compressions for a particular compressible body are removed in more than one step to find the total force equilibrium in each direction (e.g., X, Y, and Z direction in a general coordinate system). First, equilibrium in the normal direction with respect to the face of the compressible body with interference (e.g., the Y axis) is established. Once that is achieved, the equilibrium in the planar/perpendicular direction (e.g., the X and Z axes) is established. This can be determined in one single solving step, or split into several steps (e.g., one step for each compressible body in the model).

While the compressions are deactivated, the non-linear contacts remain active so each compressible body stays in its compressed state. Once the applied compressions are removed from each compressible body, the automated mechanical interaction engine 302 communicates with FEM solver 320 to yield mechanical properties 314 of the electronic assembly. Mechanical properties 314 may comprise the mechanical behavior of the assembly, including the final force equilibrium or the stress state of the package as assembled.

Depending on the complexity of the assembly, the mechanical behavior of the package may be determined by solving for each compressible body individually, or by solving for all compressible bodies at the same time. In embodiments where each compressible body is solved for individually, the contact activation and compression steps for each compressible body are performed one body at a time. That is, compression is applied to one compressible body, the non-linear contact is activated, and the compression is removed. Then, the same steps are applied to a next compressible body in the package. In other embodiments, the contacts are activated and compressions removed in all compressible bodies at the same time. Solving for one compressible body at a time will increase the computation time but decrease the difficulty in obtaining the new force equilibrium.

In embodiments, after the automated mechanical interaction engine 302 performs each of its steps, a user may add additional load steps to model operation conditions, temperature shifts, vibration analyses, additional thermal/structural loads, etc. The user may also have the option to add bolt pretensions and/or thermal cycling via a user interface. In embodiments, after the user is satisfied with the design, the automated mechanical interaction engine 302 in communication with the FEM solver 320 produces a design fabrication of the electronic package. This design fabrication is used to produce the electronic package according to user specifications.

An example of the above method is depicted in the FIG. 4 embodiments. FIGS. 4A-4D illustrate example displays on a user interface corresponding to the aforementioned simulation methodology and results. FIG. 4A depicts an original CAD geometry of an electronic assembly 400 comprising compressible bodies 402. In this embodiment, assembly 400 is made of aluminum steel and compressible bodies 402 are thermal pads. As seen in FIG. 4A, geometric interferences 404 are present where the thermal pads 402 interfere with surrounding components. To remove the interferences of each thermal pad, compressions are applied (e.g., displacements are generated), as seen in FIG. 4B. After all contacts are activated and compressions are removed, the resulting output of the simulation is the final force equilibrium of the assembly, as depicted in FIGS. 4C and 4D. Specifically, FIG. 4C shows the final stress state of the package with both thermal pads in their compressed states, and FIG. 4D depicts the compression force appropriate to achieve that state. As discussed above, the user may interact with the interface to adjust operation conditions, apply bolt pretensions, or implement thermal cycling.

Figure 5:
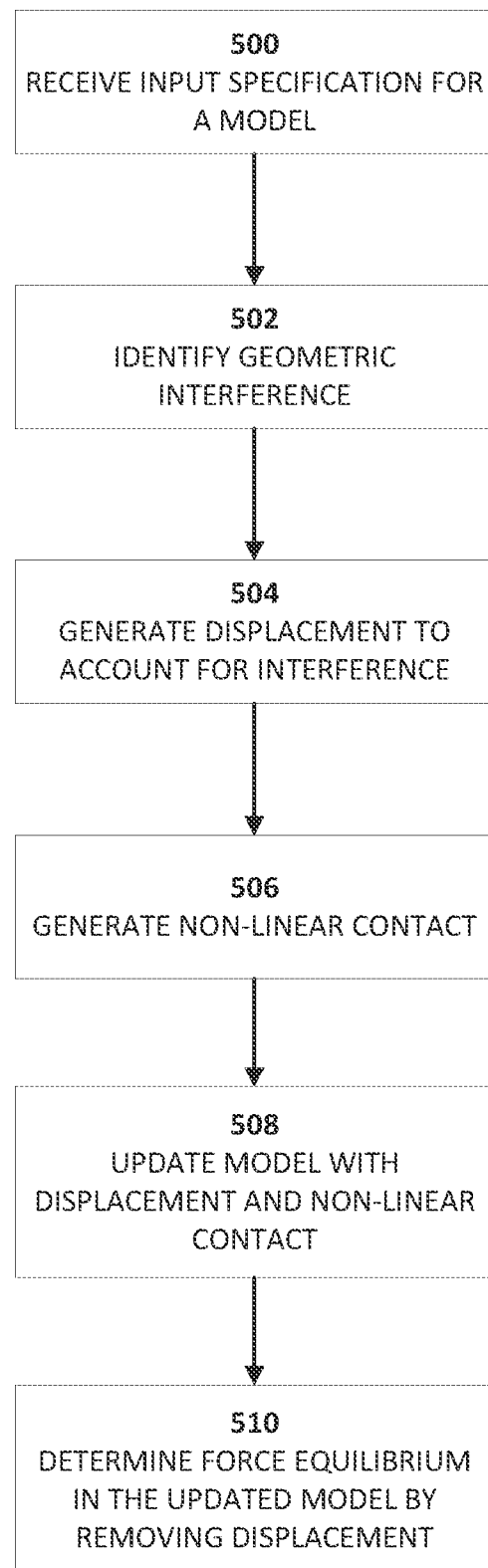
FIG. 5 is a flow diagram depicting an example method for determining mechanical properties of an electronic assembly in a simulation.

An example method for determining the mechanical properties of an electronic assembly is described in FIG. 5. At 500, the simulation receives an input specification for a model of an electronic assembly, including a CAD geometry, from a user. The input specification defines an electronic assembly comprising at least one compressible body (e.g., a thermal pad or gasket) with one or more surrounding components. Based on the input data, a geometric interference is identified at 502. As discussed in detail above, the geometric interference is determined by measuring the "overlap" between the compressible body in its resting state, i.e., uncompressed, and the surrounding body. Where there is a geometric interference, a non-linear contact is identified between the compressible body and the surrounding component. Next, at 504, a displacement is generated for the compressible body to account for the geometric interference. An example method for generating a displacement is described more fully in FIG. 6. Returning to FIG. 5, at 506, the non-linear contact between the compressible body and the surrounding component is generated or activated, thus fixing the compressible body in its displaced state. Then, at 508, the model is updated with the generated displacement and non-linear contact.

Lastly, at 510, a force equilibrium is determined in the updated model by removing the generated displacement. Because the non-linear contact remains active, the compressible body stays in its displaced state when the displacement is removed, and thus produces a force against the surrounding component. The resulting force equilibrium between the compressible body and the surrounding component determines a final stress state of the electronic package in a fully assembled position.

Figure 6:
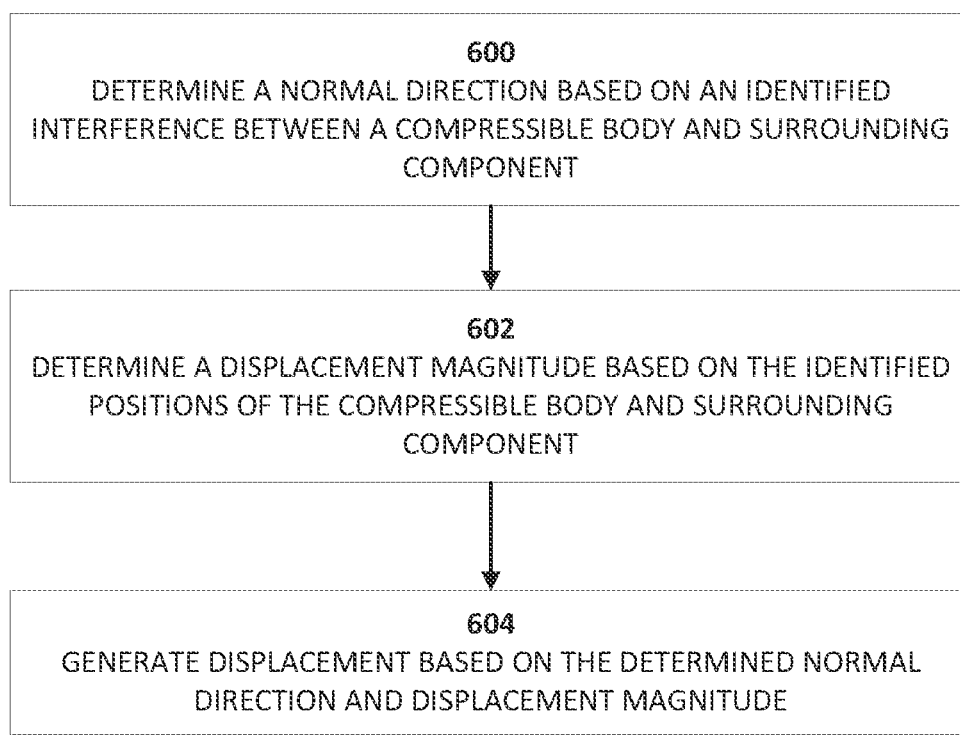
FIG. 6 depicts an example method for generating a displacement in a direction.

FIG. 6 describes an example method for generating a displacement in a direction. At 600, a normal direction is determined based on an identified geometric interference between a compressible body and a surrounding component. As previously discussed, a geometric interference is automatically calculated for a compressible body via the automated mechanical interaction engine. In embodiments, the normal direction is a direction inwards the compressible body in order to simulate a compression. For example, as seen in the FIG. 2D embodiment, the determined normal directions are depicted by the vertical arrows. Returning to FIG. 6, at 602, a displacement magnitude is determined based on the identified positions of the compressible body and surrounding component. In embodiments, the displacement magnitude is of a degree sufficient to remove the geometric interference. For example, the displacement magnitude may be set at a slightly bigger value than the calculated interference. Then, at 604, a displacement is generated for a compressible body based on the determined normal direction and displacement magnitude.

The methods and systems described herein may be implemented using any suitable processing system with any suitable combination of hardware, software and/or firmware, such as described below with reference to the non-limiting examples of FIGS. 7A, 7B, and 7C.

Figure 7A:
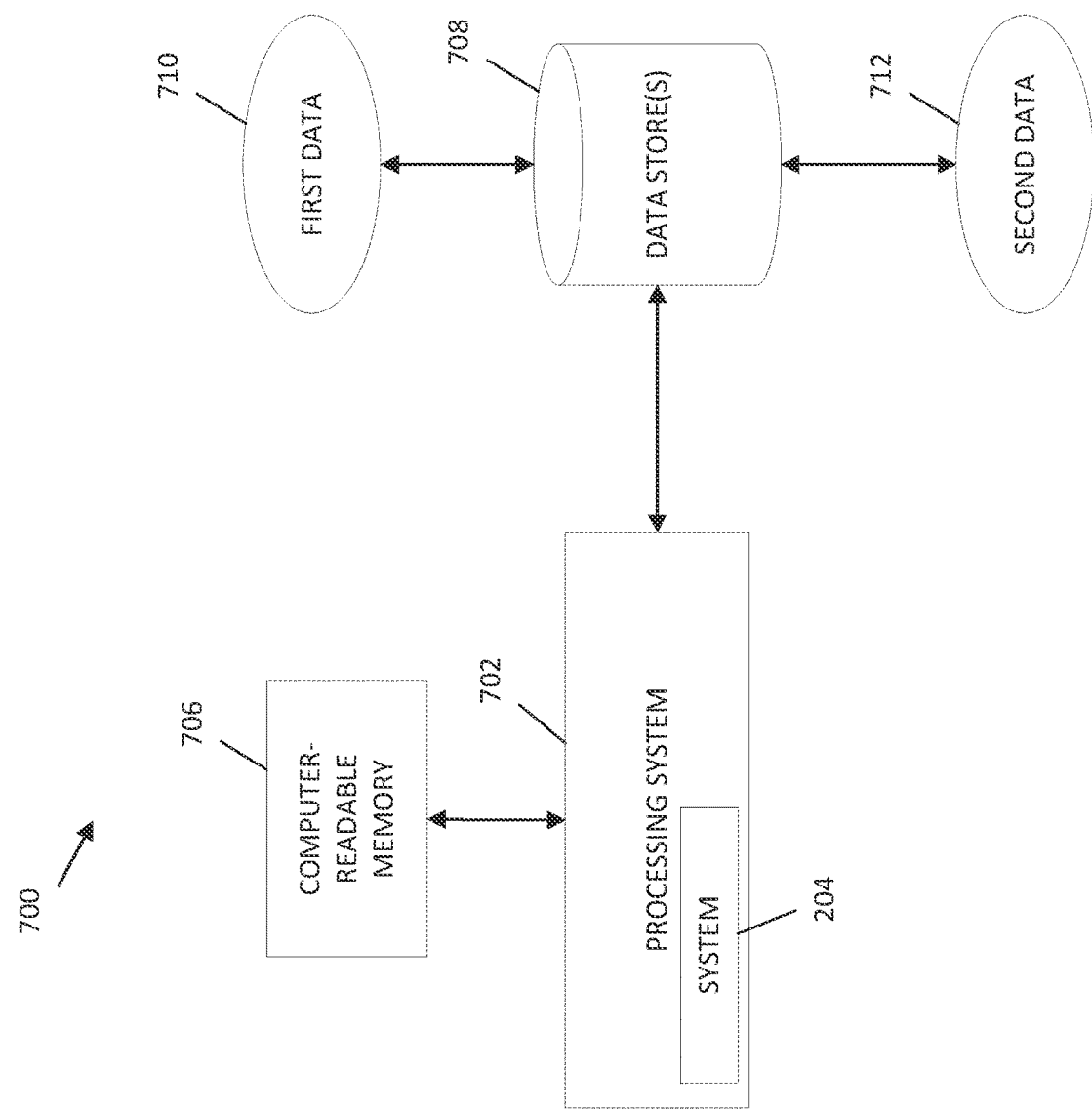
FIGS. 7A-7C depict example systems for use in implementing a model for determining mechanical properties of an electronic assembly.
Figure 7B:
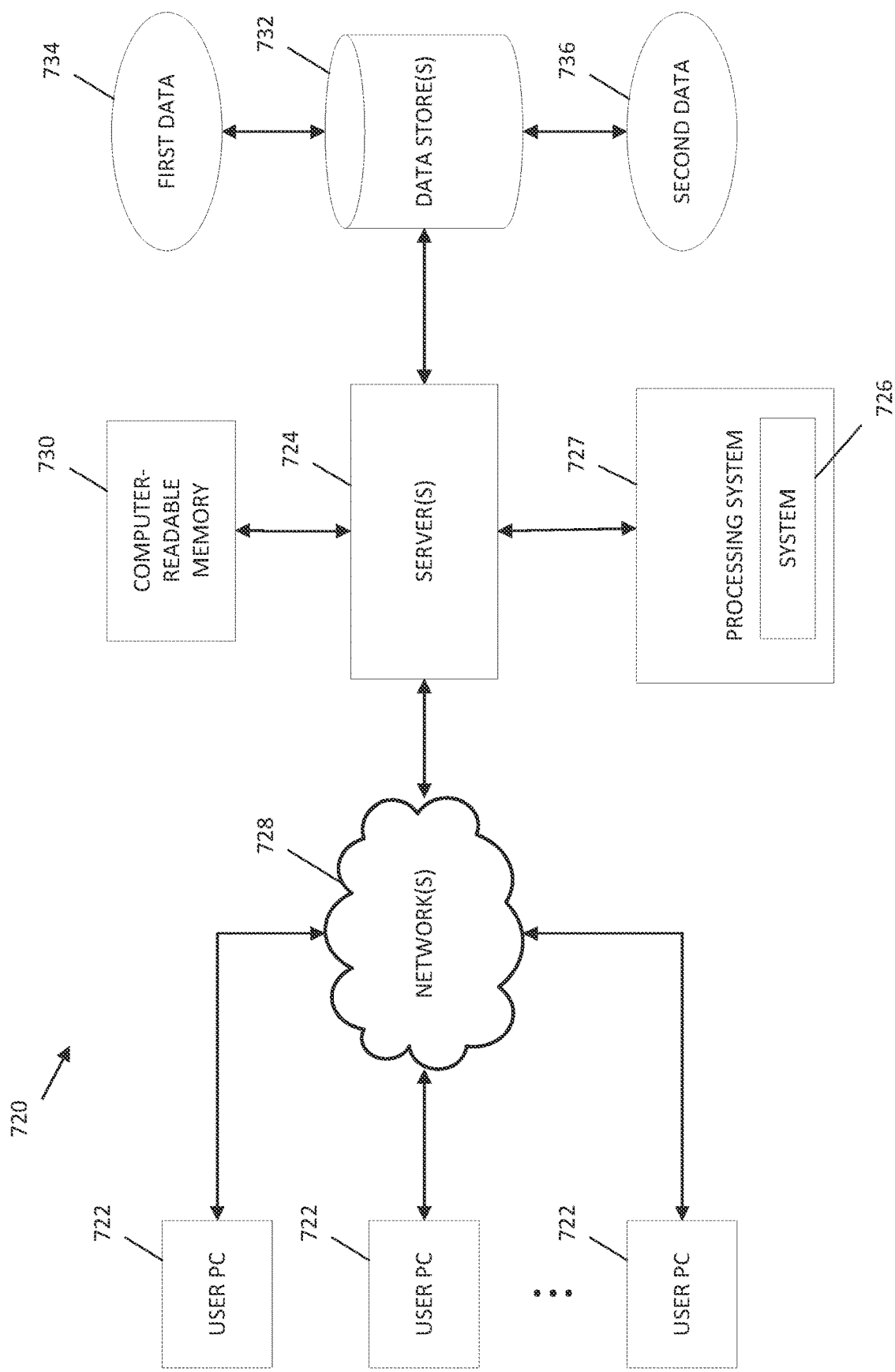
Figure 7C:
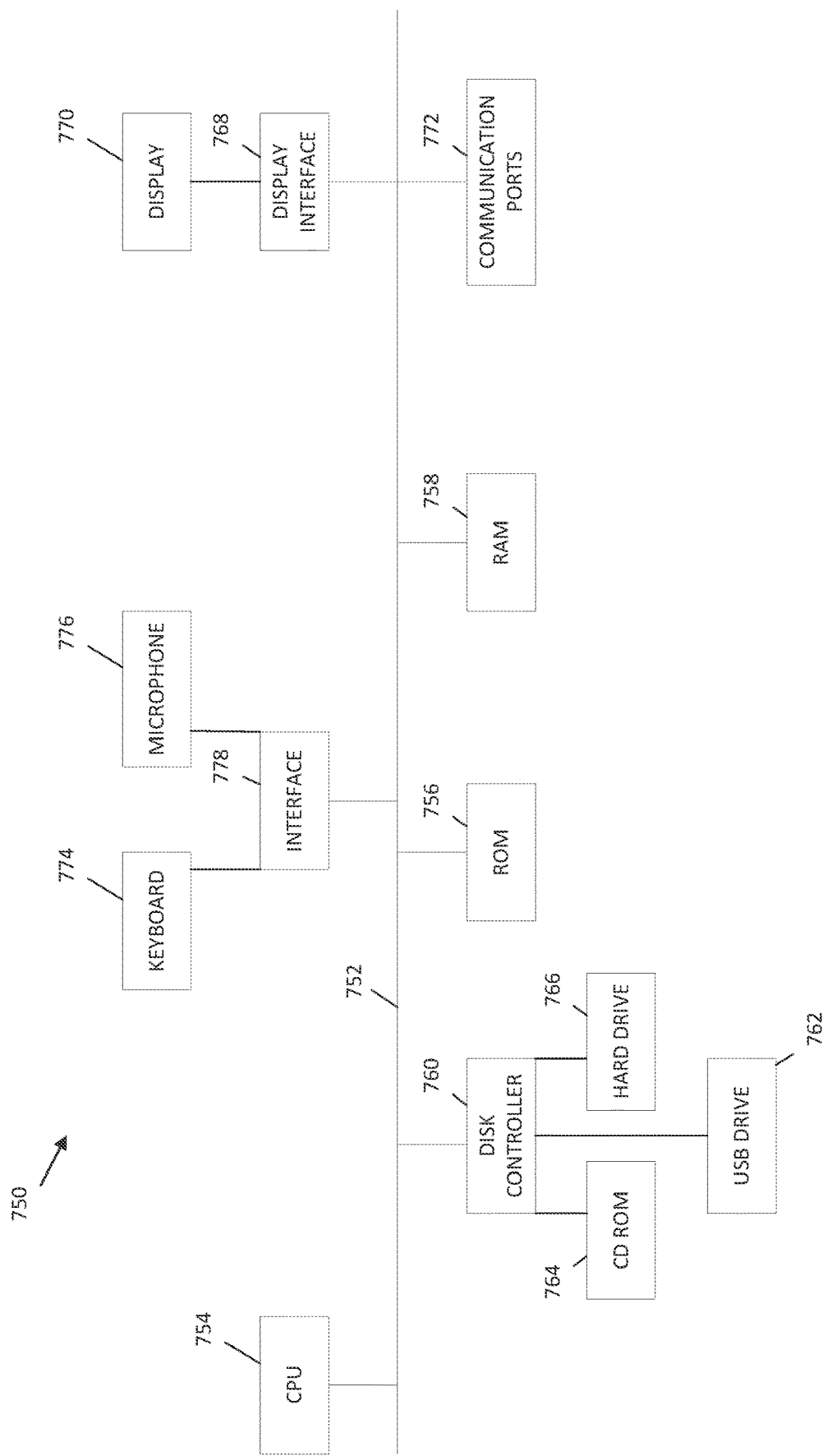

FIGS. 7A, 7B, and 7C depict example systems for use in implementing a system. For example, FIG. 7A depicts an exemplary system 700 that includes a standalone computer architecture where a processing system 702 (e.g., one or more computer processors) includes a system 704 being executed on it. The processing system 702 has access to a non-transitory computer-readable memory 706 in addition to one or more data stores 708. The one or more data stores 708 may contain first data 710 as well as second 712.

FIG. 7B depicts a system 720 that includes a client server architecture. One or more user PCs 722 access one or more servers 724 running a system 726 on a processing system 727 via one or more networks 728. The one or more servers 724 may access a non-transitory computer readable memory 730 as well as one or more data stores 732. The one or more data stores 732 may contain first data 734 as well as second data 736.

FIG. 7C shows a block diagram of exemplary hardware for a standalone computer architecture 750, such as the architecture depicted in FIG. 7A, that may be used to contain and/or implement the program instructions of system embodiments of the present invention. A bus 752 may serve as the information highway interconnecting the other illustrated components of the hardware. A processing system 754 labeled CPU (central processing unit) (e.g., one or more computer processors), may perform calculations and logic operations required to execute a program. A non-transitory computer-readable storage medium, such as read only memory (ROM) 756 and random access memory (RAM) 758, may be in communication with the processing system 754 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 778 may permit information from the bus 752 to be displayed on a display 770 in audio, graphic, or alphanumeric format. Communication with external devices may optionally occur using various communication ports 772.

In addition to the standard computer-type components, the hardware may also include data input devices, such as a keyboard 774, or other input device 776, such as a microphone, remote control, pointer, mouse and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes the plural reference unless the context clearly dictates otherwise. Also, as used in the description herein and throughout the claims that follow, the meaning of "in" includes "on" unless that context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate a situation where only the disjunctive meaning may apply.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A method for determining mechanical properties of an assembly, the method comprising:
    receiving an input specification for a model of the assembly, wherein the input specification includes a compressible body and a surrounding component in the electronic assembly;
    identifying a geometric interference in the model as an overlap between the compressible body and the surrounding component;
    generating a displacement for the compressible body to account for the geometric interference;
    updating the model with the displacement; and
    determining a resulting force equilibrium within the electronic assembly based on the updated model, wherein the resulting force equilibrium is determined with the displacement removed from the updated model.

2. The method of claim 1, wherein the mechanical properties comprise a final stress state of the assembly as assembled.

3. The method of claim 1, wherein the compressible body includes a thermal pad.

4. The method of claim 1, wherein the compressible body includes a gasket.

5. The method of claim 1, further comprising:
    displaying the resulting force equilibrium of the assembly to a user via a user interface.

6. The method of claim 5, further comprising:
    receiving, from the user via the user interface, additional input data relating to operating conditions for the assembly, and
    adjusting the resulting force equilibrium to account for the operating conditions.

7. The method of claim 1, wherein the input specification for the model of the assembly comprises a second compressible body in the assembly, and further comprising:
    identifying a geometric interference between the second compressible body and the surrounding component;
    generating a second displacement for the second compressible body to account for the geometric interference between the second compressible body and the surrounding component;
    further updating the model with the second displacement; and
    determining a new force equilibrium within the assembly based on the further updated model, wherein the new force equilibrium is determined with the second displacement removed from the further updated model.

8. The method of claim 1, wherein the generating a displacement for the compressible body comprises generating a displacement in a normal direction and a displacement in a planar direction;
    wherein the removing the displacement from the updated model comprises first removing the displacement in the normal direction, and next removing the displacement in the planar direction.

9. A computer-implemented system for determining mechanical properties of an assembly, the computer-implemented system comprising:
    one or more data processors;
    one or more non-transitory computer-readable storage mediums encoded with instructions for commanding the one or more data processors to execute steps that comprise:
        receiving an input specification for a model of the assembly, wherein the input specification includes a compressible body and a surrounding component in the electronic assembly;
        identifying a geometric interference in the model as an overlap between the compressible body and the surrounding component;
        generating a displacement for the compressible body to account for the geometric interference;
        updating the model with the displacement; and
        determining a resulting force equilibrium within the assembly based on the updated model, wherein the resulting force equilibrium is determined with the displacement removed from the updated model.

10. The computer-implemented system of claim 9, wherein the mechanical properties comprise a final stress state of the assembly as assembled.

11. The computer-implemented system of claim 9, wherein the compressible body includes a thermal pad.

12. The computer-implemented system of claim 9, wherein the compressible body includes a gasket.

13. The computer-implemented system of claim 9, wherein the executable steps further include:
    displaying the resulting force equilibrium of the assembly to a user via a user interface.

14. The computer-implemented system of claim 13, wherein the executable steps further comprise:
    receiving, from the user via the user interface, additional input data relating to operating conditions for the assembly, and
    adjusting the resulting force equilibrium to account for the operating conditions.

15. The computer-implemented system of claim 9, wherein the input specification for the model of the assembly comprises a second compressible body in the electronic assembly, and the executable steps further comprise:
    identifying a geometric interference between the second compressible body and the surrounding component;

generating a second displacement for the second compressible body to account for the geometric interference between the second compressible body and the surrounding component;
further updating the model with the second displacement; and
determining a new force equilibrium within the assembly based on the further updated model, wherein the new force equilibrium is determined with the second displacement removed from the further updated model.

16. A non-transitory computer-readable storage medium instructions that, when executed by a processing system, cause the processing system to execute steps for determining mechanical properties of an assembly, the steps comprising:
receiving an input specification for a model of the assembly, wherein the input specification includes a compressible body and a surrounding component in the assembly;
identifying a geometric interference in the model as an overlap between the compressible body and the surrounding component;
generating a displacement for the compressible body to account for the geometric interference;
updating the model with the displacement; and
determining a resulting force equilibrium within the assembly based on the updated model, wherein the resulting force equilibrium is determined the displacement removed from the updated model.

17. The non-transitory computer-readable storage medium of claim 16, wherein the mechanical properties comprise a final stress state of the electronic assembly as assembled.

18. The non-transitory computer-readable storage medium of claim 16, wherein the executable steps further comprise:
displaying the resulting force equilibrium of the electronic assembly to a user via a user interface.

19. The non-transitory computer-readable storage medium of claim 18, wherein the executable steps further comprise:
receiving, from the user via the user interface, additional input data relating to operating conditions for the electronic assembly, and
adjusting the resulting force equilibrium to account for the operating conditions.

20. The non-transitory computer-readable storage medium of claim 16, wherein the input specification for the model of the assembly comprises a second compressible body in the electronic assembly, and the executable steps further include:
identifying a geometric interference between the second compressible body and the surrounding component;
generating a second displacement for the second compressible body to account for the geometric interference between the second compressible body and the surrounding component;
further updating the model with the second displacement; and
determining a new force equilibrium within the assembly based on the further updated model, wherein the new force equilibrium is determined the second displacement removed from the further updated model.

* * * * *